I. F. WILLIAMS.

Machines for Applying Flock to Felt Rubber-Goods.

No. 4,937. Reissued June 4, 1872.

WITNESSES.

Peter F. Hughes

Edwin G. Price

INVENTOR.

Isaac F. Williams

UNITED STATES PATENT OFFICE.

ISAAC F. WILLIAMS, OF BRISTOL, RHODE ISLAND.

IMPROVEMENT IN MACHINES FOR APPLYING FLOCK TO FELT-RUBBER GOODS.

Specification forming part of Letters Patent No. 33,808, dated November 26, 1861; reissue No. 4,937, dated June 4, 1872.

*To all whom it may concern:*

Be it known that ISAAC F. WILLIAMS, formerly of the city, county, and State of New York, but now of Bristol, in the State of Rhode Island, have invented certain new and useful Improvements in Machinery for Applying Flocks, Ground Cork, or other similar substances to the Surface of Water-Proof Fabrics, for the purpose of making what is generally known in the trade as "felt-rubber goods;" and I do hereby declare that the following is a full description of the same.

The nature of my improvements consists, first, in arranging the gumming-table at an inclination of about twenty-five degrees, in combination with a self-adjustable distributing-knife, so that when the solution of gum is applied to take surface of the fabric the knife-edge will cause it to flow evenly downward and laterally over the surface of the cloth, to prepare it for the application of the flock; secondly, in combining with the revolving flock-duster and case surrounding it a smut-collector, so as to prevent the gummed surface of the cloth being smutched by the flock, which has a tendency to gather in masses at the front sides of the duster-case and fall in flakes upon the surface of the cloth and thus spot it, as well as to cause it to have an unevenness of surface unlike cloth-finished goods, which these goods are designed to represent; thirdly, in the improved construction of the flock or cloth beaters by combining with fixed beaters swinging arms or beaters, so as to beat the under side of the cloth by a sudden blow to cause the flock to become more thoroughly set in the wet gum than can be done by the fixed arms of the revolving beaters; fourthly, in the improved method of arranging the carrying-rollers of the cloth so as to suspend it while under the action of the beaters and thereby prevent the cloth from jerking over the gumming-table and under the edge of the distributing-knife, and thus prevent its being evenly gummed over; fifthly, in combining with the beaters a finishing-brush; and, lastly, in the combination of mechanism for sifting the flock upon a traveling surface of gummed cloth, with mechanism for giving a continuously-progressive movement to such gummed cloth to be flocked and beaters to set the flock distributed upon its gummed surface. But, to describe my invention more particularly, I will refer to the accompanying drawing forming a part of this specification, the same letters of reference, wherever they occur, referring to like parts.

Figure 1:
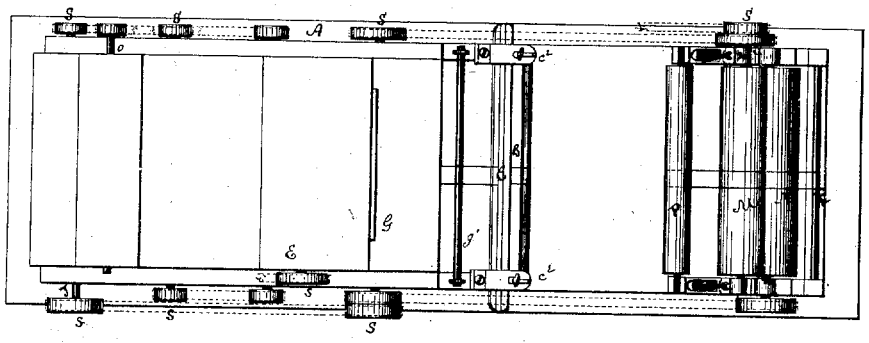
Figure 2:
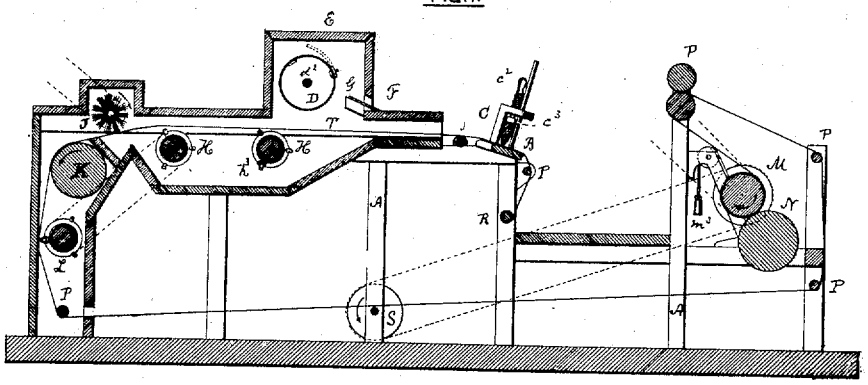
Figure 3:
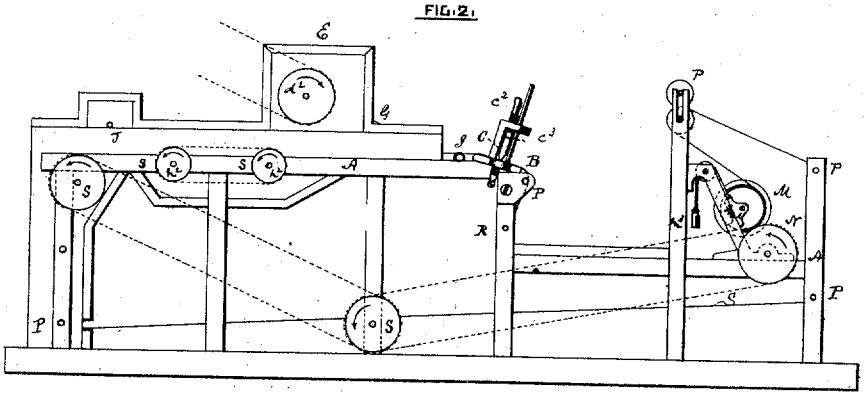

Figure 1 is a plan view of the machine. Fig. 2 is a longitudinal section through the line $x\ x$, Fig. 1. Fig. 3 is a side elevation of the machine.

A is the frame of the machine, having transversely of the top of it a gumming-table, B. This table is arranged at an inclination of some twenty to thirty degrees, so as to cause the solution of the gum, when applied to the cloth in passing over it, to spread more rapidly and evenly than would be the case if the table were level. Upon this table is secured a gum-distributer knife, C, which rests on the surface of the cloth, and, by means of set-screws $c^2$ and a spring, $c^3$, on their lower ends, is made so as to have a self-adjustable pressure on the surface of the cloth while distributing the gum over it preparatory to the flocking operation. D is a revolving flock-sifter, having an opening in its face for the introduction of the flock, and adjusted on suitable bearings $d^2$ passing through the sides of a shell or inclosed case, E, surrounding it. In the front side of this case is cut a throat, F, in which is arranged a smut-collector, G, which extends into the case till nearly in contact with the sifter. The object of this arrangement is to collect the masses of flock which have a tendency to accumulate in the front side of the case, and, by falling upon the surface of the cloth as it enters the case, causes a limpy and smutched appearance, and thereby impairs the cloth-like finish aimed at by the manufacture of this kind of goods. H H are two revolving beaters arranged on suitable bearings $h^2$ in the lower portion of the sifter-case so as to work at the lower side of the cloth, to beat or drive the flock into the wet solution of gum on its upper surface. Attached to the periphery of the front beater is a swinging beater, $h^3$. The object of this is to give a more sudden blow than is possible by the other fixed stationary beaters, and at the same time, in consequence of the swinging arm closing upon the face of the beater-axis, not jerking the cloth, as would be the case if the stationary beaters or arms were of the same diameter as the swinging arm is when distended. I is a cloth carrying and supporting roller adjusted across the frame of the machine just behind the gumming-table and so as to be slightly above the back edge of it. The object of this is to support the cloth and prevent the transmission of any drawing or jerking motion of it over the gumming-table in consequence of the action of the revolving beaters. J is a finishing-brush arranged in the back end of the sifter-case, the object of which is to lay the fiber of the flock and give a smooth cloth-like finish to the goods. K is a carrying-roller at the back end of the machine, and L a revolving beater whose duty it is to beat off any superfluous flock that may adhere to the gummed surface of the cloth. M is a cloth-roller secured in the front end of the machine in adjustable bearings $m^2$ having a balance-weight, $m^3$, attached to it by means of a cord running over a pulley to equalize the pressure on the cloth as it increases or decreases in quantity on the rolls. N is a carrying-roller upon which the cloth-roller rests. P P are carrying-rollers over which the cloth passes in going through the machine. R is the cloth-beam, arranged just under the gumming-table, and off which the cloth unwinds in the operation of flocking, &c. S S, &c., are a series of pulleys and belts for operating the several parts of the machine in a way which is well understood, and T the piece of cloth, which is made to travel progressively under the flock-sifter D.

From the foregoing description of the parts composing the machine it will be readily understood that the speed at which the cloth will travel can be so proportioned to the capacity of the sifter to distribute the flock that a uniform and regular distribution of flock upon the gummed surface of the cloth can be secured, and, by reason of the fact that beaters are employed to set the flock upon the gummed surface instead of pressure-rollers acting to embed the flock in the gum, a napped surface is given to the cloth, which may be afterward straightened and smoothed by brushing, so as to present the effect of a woven fabric.

What I claim, and desire to secure by Letters Patent, is—

1. The arrangement of the gumming-table so as to be an incline plane, as hereinbefore described, in combination with a self-adjustable gum-distributer, for the purposes hereinbefore set forth.

2. I also claim the use of the throat F and smut-collector G, or equivalent devices, in the sifter-case, as a method of preventing masses of falling flock from smutching the cloth, substantially as described.

3. I also claim the use of swinging arms or beaters $h^3$, in combination with the revolving beaters H, substantially as described, and for the purposes hereinbefore set forth.

4. I also claim the use of the cloth-tension roller I, in combination with the carrying-roller at the back end of the machine, arranged on a line below the revolving beaters, while the roller I is arranged on a line above the gumming-table, so as to support the cloth on these two points and thus prevent the blows of the beaters drawing or jerking the cloth over the surface of the gumming-table.

5. I also claim the combination of the finishing-brush J with the revolving beaters, substantially as described.

6. I also claim the combination of a flock-sifter, D, with suitable mechanism, as described, for progressively carrying along the cloth to be flocked, and beaters H arranged to set the flock upon the gummed surface, substantially as described.

ISAAC F. WILLIAMS.

Witnesses:

PETER F. HUGHES,
EDWIN C. PIERCE.